L. W. PALMER.
COMBINED ELEVATING AND CONVEYING MACHINE.
APPLICATION FILED FEB. 12, 1917.
1,253,717.
Patented Jan. 15, 1918.
3 SHEETS—SHEET 3.
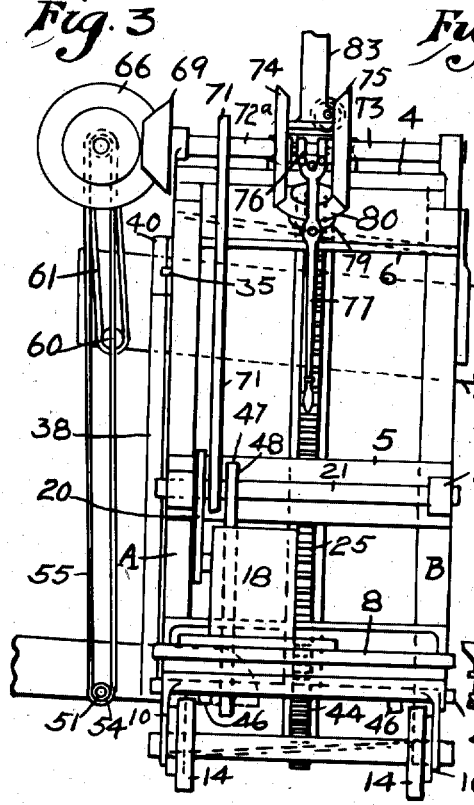
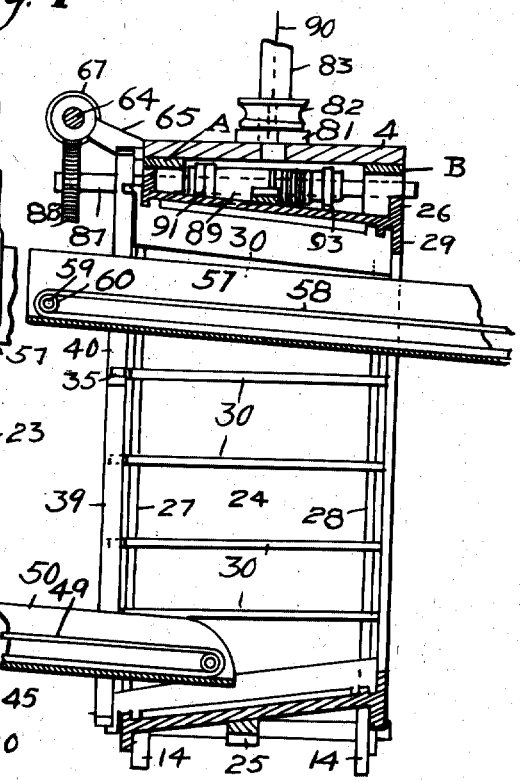
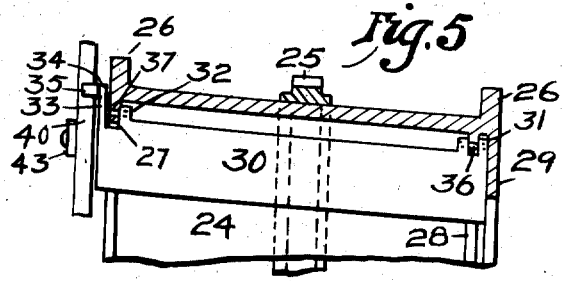

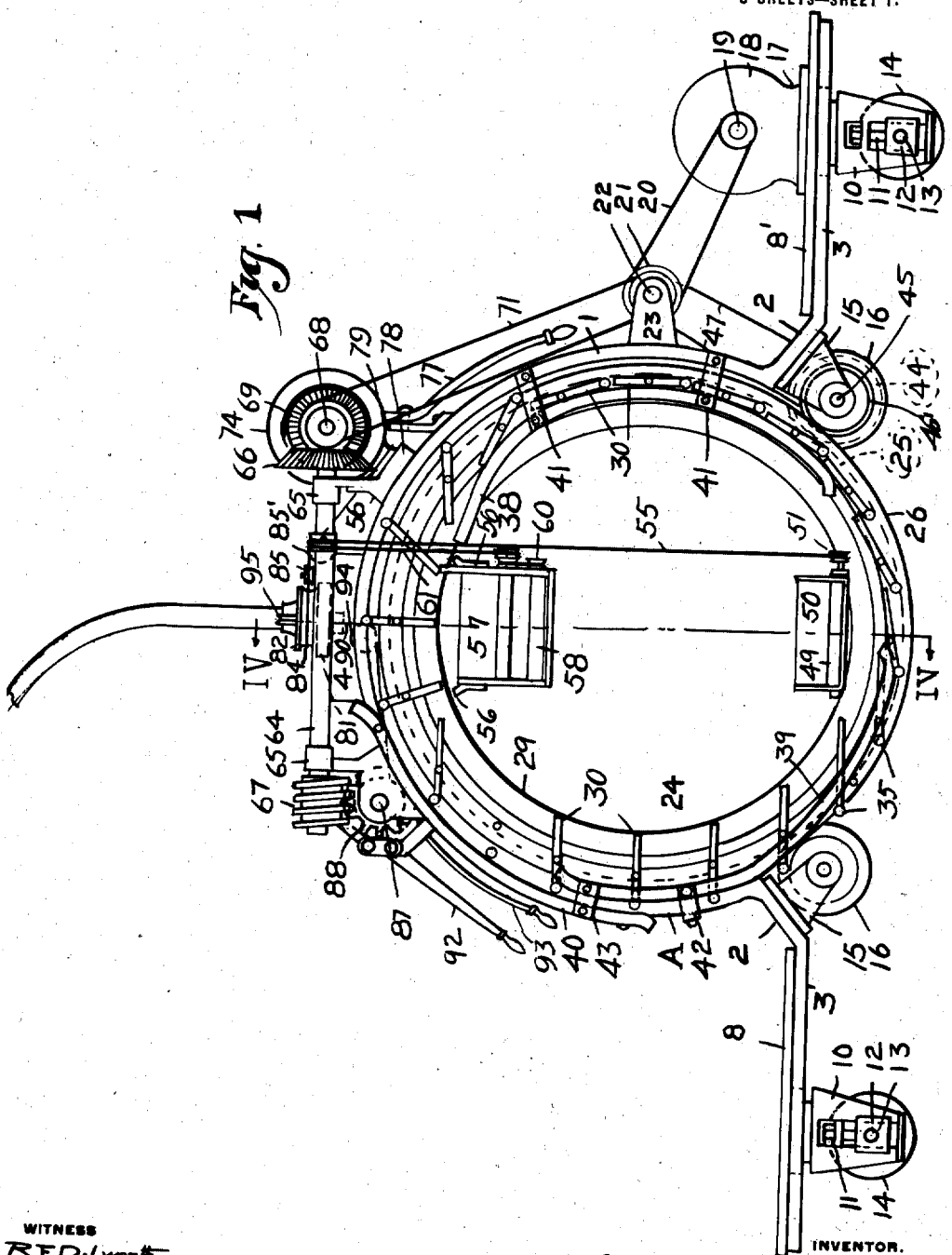

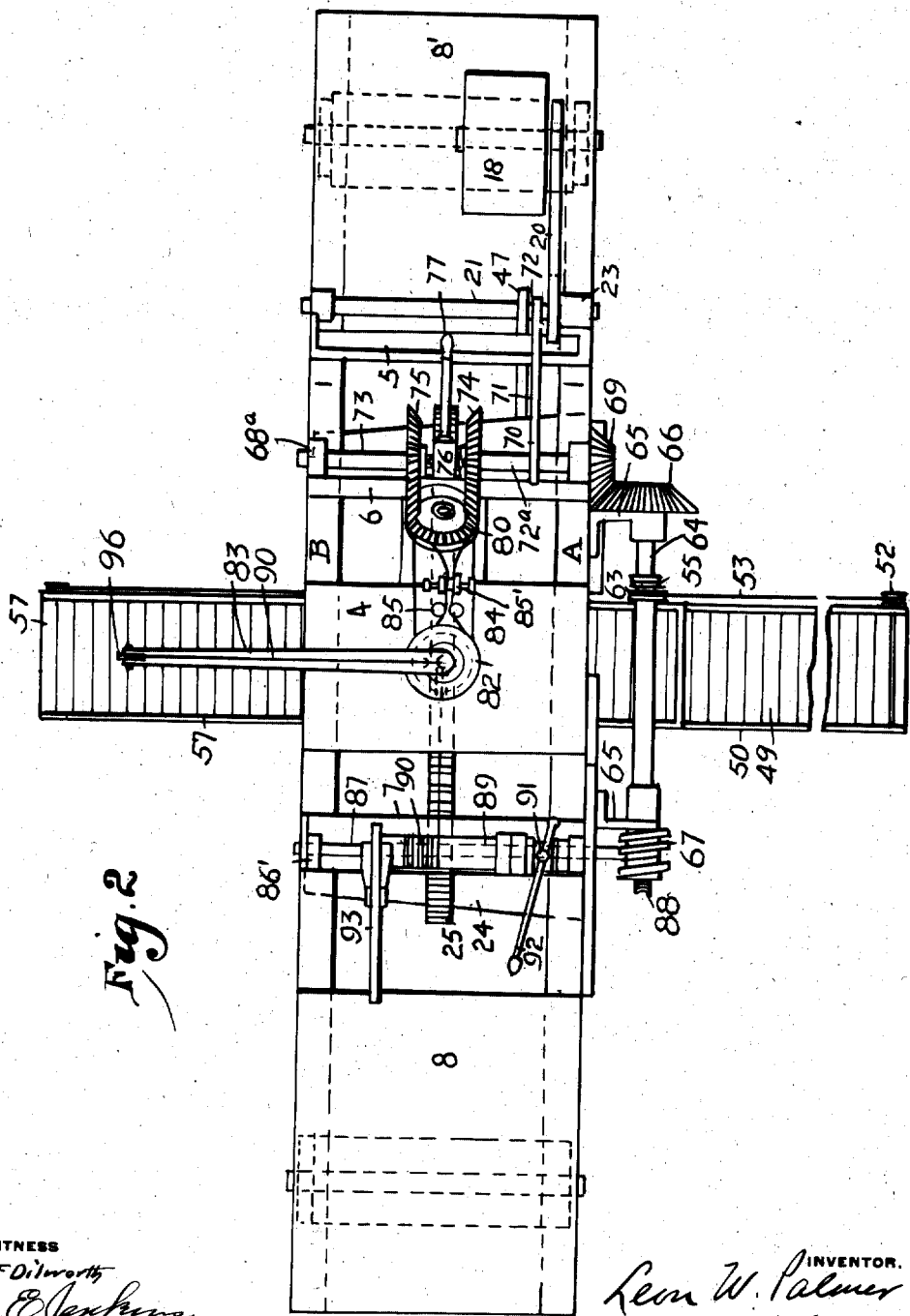

UNITED STATES PATENT OFFICE.

LEON W. PALMER, OF UNITY, PENNSYLVANIA.

COMBINED ELEVATING AND CONVEYING MACHINE.

1,253,717.  Specification of Letters Patent.  Patented Jan. 15, 1918.

Application filed February 12, 1917. Serial No. 148,201.

*To all whom it may concern:*

Be it known that I, LEON W. PALMER, a citizen of the United States of America, residing at Unity, county of Allegheny, and State of Pennsylvania, have invented certain new and useful Improvements in Combined Elevating and Conveying Machines, of which the following is a specification.

This invention relates to a combined elevating and conveying machine, particularly adapted for use in unloading railway cars, but it is to be understood that the machine can be employed for any other purposes wherein it is found applicable, and the invention has for its object to provide a machine of the class referred to, in a manner as hereinafter set forth, with means for conveying the contents of a car to an elevating mechanism which will elevate the material conveyed from the car to an elevated point of discharge, and to further provide the machine with a hoisting mechanism for removing large objects from a car and shifting them to a point desired, said hoisting mechanism operated from the same source of power which drives the conveying means and elevating mechanism.

Further objects of the invention are to provide an elevating and conveying machine having means, in a manner as hereinafter set forth, for receiving the contents of a car, through the bottom of the latter, and then conveying the material to an elevated point of discharge so that the material removed from the car can be conducted to any desired point.

Further objects of the invention are to provide a machine of the class referred to which is comparatively simple in its construction and arrangement, strong, durable, portable, efficient and convenient in its use, readily set up and comparatively inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of an elevating and conveying machine in accordance with this invention.

Fig. 2 is a top plan view.
Fig. 3 is a side elevation.
Fig. 4 is a section on line IV—IV, Fig. 1.
Fig. 5 is a sectional detail of a drum.

The machine includes a portable supporting frame consisting of a pair of elongated bars each bent to form a circular central portion 1, a pair of outwardly inclined portions 2, which merge into the central portion 1, and a pair of longitudinally extending end portions 3. The bars of the supporting frame are connected together by a transverse plate 4 which is arranged at the top of the circular central portions 1, a flat transverse plate 5 connecting the supporting bars together at one side of the circular portions 1 of said bars, a transverse plate 6 which connects the supporting bars together at a point above the plate 5, and a transverse plate 7 which connects the supporting bars together on that side of the circular portions 1 opposite from that side to which plate 5 is secured. Mounted upon the longitudinally extending portions 3 are platforms 8, 8' which also act as a means for connecting the supporting bars together.

Each of the longitudinally extending portions 3 of the supporting bars has a depending support 10, which is vertically adjustable, as at 11, upon an axle bearing 12. 13 denotes the axle and 14 the wheels carried thereby.

That bar of the supporting frame which is arranged at the front of the machine is indicated at A and the bar at the rear at B. The supporting members 10 of the bar A are arranged in alinement with the supporting members 10 of the bar B. An axle 13 associates with each pair of alining supporting members 10. By this arrangement the supporting members, axles, wheels, and bars A, B, provide a truck frame.

Each outwardly inclined portion 2 has secured to its inner face a depending inclined bearing bracket 15, in which is journaled a flanged supporting roll 16. The rolls 16, supported by the brackets 15 of the inclined portions 2 of the bar B, are of greater diameter than the rolls 16 supported in the brackets 15 of the inclined portions 2 of the bar A and the reason for this arrangement of rolls of different diameter will be presently referred to.

Mounted upon the platform 81 is the base 17 of a motor 18. The latter may be an explosive or an electric motor. The shaft of the motor 18 is indicated at 19 and is connected by a transmission belt 20, to a pulley 21, mounted on a shaft 22, which is journaled in brackets 23, supported by the plate 5.

Supported by the rollers 16 is a drum 24, which tapers from its forward to its rear end, and has a circumferentially extending cog rack 25 on its periphery. The rack 25 is arranged centrally of the ends of the drum 24. At each end of the drum a peripheral annular flange 26 is provided, and the said flanges 26 ride on the rollers 16 when the drum is revolved, and with the flanges of the rollers positioned against the inner faces of the flanges 26. This arrangement prevents lengthwise shifting of the drum 24.

At the forward end of the drum 24 an inwardly extending annular flange 27 is arranged and in proximity to the rear end of the drum 24 the inner face of the latter is provided with an inwardly extending annular flange 28 of the same width as the flange 27. The drum 24 at its rear end has an inwardly extending annular flange 29 and which is spaced from and is of greater width than the flange 28.

The drum 24 provides a revolving support for an elevating mechanism for the material which is conveyed to the drum from the car in a manner as hereinafter referred to. The said elevating mechanism consists of a series of equally spaced dumping carriers which are arranged within and hinged to the drum 24. Each of said carriers consists of a flat plate 30 of a length nearly as long as the length of the drum 24. The plate 30 is provided at one end with a pair of spaced apertured lugs 31 of equal length, and at the other end with a pair of spaced apertured lugs 32, 33, the latter being of greater length than the former and having its free end formed with a right angular extension 34, provided with a roller 35. The lugs 31 straddle the flange 28 and are hinged therewith by the pin 36. The lugs 32, 33, straddle the flange 27 and are hinged therewith by the pin 37. The lug 33 when the carrier is set up with respect to the drum 24 is arranged outwardly thereof and projects beyond the periphery of the drum.

The lugs 33 are termed trip arms and associate with a series of curved trip members, 38, 39 and 40 suspended from the bar A at the circular portion 1 thereof. The member 38 is arranged at one side of the circular portion 1 and its function is to hold the carriers against the inner face of the drum after the carriers have dumped and are being moved to a position to be loaded as the drum is revolved. This action is caused by the rollers 35 traveling against the outer face of the member 38. The lugs 33 extend between the member 38 and the drum.

The member 39 is arranged on the circular portion 1 opposite the member 38 and its function is to trip and hold the carriers in position to receive and support the material conveyed from the car as the drum 24 revolves and elevates the carriers toward the point of discharge. The lugs 33 extend between the member 39 and the drum and the rollers 35 travel against the outer face of the member 39.

The member 40 is arranged on the circular portion 1 opposite the member 38 and above the member 39 and its function is the same as the member 39. The rollers 35 travel against the inner face of the member 40.

The suspension means for the member 38 is indicated at 41 and is in the form of a short arm, that for the member 39 at 42 and that for the member 40 at 43.

The member 38, at its upper and lower ends, projects toward the drum 24 and terminates at a point below the top and above the bottom of the drum. The projection is greater at the top than at its bottom and the rollers 35 do not contact with the outer face of the member 38 until the upper projection portion of the member 38 is cleared. The lower projection portion of the member 38 provides what may be termed a clearance when the rollers 35 pass off the member 38.

The member 39 extends from about the middle of the drum to the center of the bottom of the latter, and has its lower end extended inwardly so that the rollers 35 will be deflected to travel against the inner face of the member 39.

The member 40 is arranged outwardly with respect to the member 39 and extends from near the top to the center of the drum. The upper end of the member 40 projects outwardly so as not to interfere with the dumping of the carrier when the latter arrives at the dumping or discharging point which begins to one side of the center of the top of the drum.

The drum is revolved by the engagement with the rack 25, of a cog wheel 44, secured on a shaft 45 carried by a support 46 secured to opposite inclined portions 2 of the bars A, B. The shaft 45 is operated by a pulley 46', carried thereon, driven by a belt 47, which is operated by a pulley 48 on the shaft 21.

Extending into the bottom of the drum 24 at the forward end thereof is an endless conveyer 49 mounted in a trough 50. The side walls of the latter support conveyer shafts 51, 52, for operating the conveyer 49. The bottom of the trough 50 prevents sagging of the lower portion of the conveyer. The shafts 51, 52, are operatively connected together as at 53. The shaft 51 is extended and connected as at 54 to an operating means therefor, in the form of an endless belt 55.

When the machine is employed for conveying the contents of a car, the conveyer 49 is extending under the dumping bottom of the car. The truck is lowered by the element 11, to allow of such positioning of the conveyer 49. The material is transferred by the conveyer 49 to the drum and is discharged into the carriers which elevate the material to the top of the drum, where it is dumped and carried off by means to be presently referred to.

Suspended from the bars A, B, by the inclined hangers 56, is an inclined chute 57, which extends entirely through the drum 24 at the top thereof and projects beyond the rear end of said drum 24. Within the chute 57 is an endless conveyer 58, which is operated by a shaft 59 provided with a pulley 60 driven by an endless belt 61. The material elevated by the carriers is dumped upon the conveyer 58 and transported to the point desired. The chute 57 is spaced from the inner face of the drum 24 so as not to interfere with the carriers as the drum is revolved.

The chute 57, for the conveyer 58, which carries the material away from the elevator, has its right side extended upwardly high enough to catch all material which might roll across the conveyer and drop off, were it not for the right side extending upwardly enough to stop it. This side serves two purposes, one to stop the material from falling over, the other to trip the plates 30, and turn them in the position shown.

The belts 55 and 61 are driven from pulleys 62, 63, respectively, carried by a shaft 64, supported by brackets 65, secured to the top of the circular portion 1 of the bar A. The shaft 64 at one end has a bevel gear 66 and at its other end a worm 67.

Supported in brackets 68ª on the plate 6 is a shaft 68, having on one end a bevel gear 69, which meshes with the gear 65 for driving the shaft 64. The shaft 68 has a pulley 70, which is driven by an endless belt 71, operatively connected with a pulley 72 on the shaft 21.

Loosely mounted on the shaft 68 is a pair of hollow shafts 72ª, 73, one having its inner end provided with a bevel gear 74 and the other its inner end with a bevel gear 75. Upon the shaft 68, between the gears 74, 75, is slidably arranged a clutching member 76 capable of engaging with either of the gears 74, 75, for clutching it to the shaft 68 causing thereby the driving of such gear and its respective hollow shaft. The member 76 is shifted by a lever handle 77.

Supported from the plate 6 is a base member 78 having a grooved wheel 79 journaled thereupon. Fixed to the wheel 79 is a bevel gear 80 which is driven by either of the bevel gears 74, 75, causing the wheel 79 to revolve therewith.

Mounted upon the plate or platform 4 is a base 81 having a grooved bull wheel 82 journaled thereupon. Carried by the wheel is a mast or boom 83, which is turned by an endless belt 84 traveling around the wheels 82 and 79. The belt 84 moves against a pair of idler pulleys 85 which brings the sides of the belt 84 close together in proximity to the wheel 92. The belt 84 also travels over a grooved pulley 85' disposed in proximity to the pulleys 85 and arranged on an axis at right angles to the axes of the pulleys 85. The pulleys 85, and 86 are supported on the plate or platform 4.

Supported in brackets 86' carried by the plate 7 is a shaft 87, having a worm gear 88, which meshes with the worm 67 on the shaft 64. Loosely mounted on the shaft 87 is a drum 89 upon which winds and unwinds a hoisting cable 90. The drum 89 is clutched to the shaft 87, by a clutching mechanism 91, which includes a lever handle 92 for operating it. A brake mechanism 93 is provided for retarding the operation of the drum 89 when playing out the cable 90.

The cable 90 passes under a pulley 94 supported from the plate 4 and around a pulley 95 mounted on the base 81. The upper end of the mast or boom 83 has a pulley 96 over which travels the cable 90. The mast or boom 83 is curved so as to project beyond either of the bars A, B. The cable 90, its operating means and the mast or boom 83 are employed for hoisting heavy objects from a car and transporting them to the point desired.

The vertical adjustment of the portable supporting frame is provided to elevate the drum 24, to be clear of any obstructions, such as projecting ties or other obstacles when transporting the drum from point to point and further for positioning the lower conveyer with respect to the dumping bottom of the cars.

The several lever handles and the brake mechanism are arranged in convenient reach of the operators who usually stand on the platforms 8 and 9.

What I claim is:—

1. A machine for the purpose set forth comprising a revolving drum, a portable support therefor, hinged dumping carriers arranged within the drum, means suspended from said support and arranged exteriorly of the inlet end of the drum for maintaining the carriers against the inner face of the drum after the dumping of the carriers, means suspended from the support and arranged exteriorly of the inlet end of the drum for maintaining the carriers in position to receive a load and in loading position from the loading point to the dumping point, and operating means carried by said support for said drum, means for conveying material into the drum to load the carriers, and means suspended from said support and extending into the drum for receiving and conveying of the material dumped from the carriers, said last mentioned means constituting a trip for initially shifting the carriers toward the inner face of the drum after dumping.

2. A machine for the purpose set forth comprising a portable support, a drum mounted therein and revolubly supported thereby, means carried by the support and operatively engaging with said drum for driving it, dumping carriers arranged within and hinged to the drum, said carriers further projecting from the inlet end of the drum, means suspended from said support and arranged exteriorly of the inlet end of the drum and engaging with the projecting ends of the carriers for maintaining these latter against the inner face of the drum after dumping, and means suspended from the support and arranged exteriorly of the inlet end of the drum and engaging with the projecting ends of the carriers for maintaining them in position to receive and load and in loaded position from the loading point to the dumping point, means for conveying material into the drum to load the carriers, and means suspended from the top of support and arranged within the drum for receiving and conveying material dumped from the carriers, said last mentioned means constituting a trip for initially shifting carriers to float against the inner face of the drum after dumping.

3. A machine for the purpose set forth comprising a revolving drum, a portable support therefor, dumping carriers arranged within and hinged to the drum, a plurality of trip elements suspended from the support and engaged by the carriers for holding these latter against the drum after dumping, one of said trip elements arranged exteriorly of one side of the inlet end of the drum, means for conveying off the material dumped by said carriers, said means having a part thereof constituting the other of said trip elements, a pair of trip members suspended from said supports and arranged exteriorly of the other side of the inlet end of the drum and engaged by the carriers for extending them to receive a load and for maintaining them in loaded position from the loading point to the dumping point, means for conveying material to said drum to load the carriers and operating means for said drum and conveyer means.

In testimony whereof I affix my signature in the presence of two witnesses.

LEON W. PALMER.

Witnesses:
MARGARET PALMER,
MAX H. SROLOVITZ.